United States Patent
Kolmanovsky et al.

(10) Patent No.: US 6,651,492 B2
(45) Date of Patent: Nov. 25, 2003

(54) METHOD AND SYSTEM FOR CONTROLLING PARTIAL PRESSURE OF AIR IN AN INTAKE MANIFOLD OF AN ENGINE

(75) Inventors: Ilya V. Kolmanovsky, Ypsilanti, MI (US); Alexander Anatoljevich Stotsky, Gothenburg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

(21) Appl. No.: 10/000,648

(22) Filed: Nov. 1, 2001

(65) Prior Publication Data

US 2003/0079721 A1 May 1, 2003

(51) Int. Cl.$^7$ .............................................. G01M 19/00
(52) U.S. Cl. ..................................................... 73/118.2
(58) Field of Search ..................... 73/118.2; 123/568.21, 123/399, 698

(56) References Cited

U.S. PATENT DOCUMENTS

| | | | |
|---|---|---|---|
| 4,881,509 A | * 11/1989 | Ohashi et al. | ......... 123/568.29 |
| 5,205,260 A | 4/1993 | Takahashi et al. | |
| 5,273,019 A | 12/1993 | Matthews et al. | |
| 5,934,249 A | 8/1999 | Nanba et al. | |
| 5,941,927 A | * 8/1999 | Pfitz | ......................... 73/118.2 |
| 6,170,475 B1 | 1/2001 | Lewis et al. | |
| 6,247,462 B1 | 6/2001 | Wild et al. | |
| 6,352,065 B1 | * 3/2002 | Wild et al. | ................. 73/118.2 |
| 6,422,202 B1 | * 7/2002 | Wild | ........................... 123/399 |
| 2003/0093212 A1 | * 5/2003 | Kotwicki et al. | .......... 73/118.2 |

* cited by examiner

Primary Examiner—Erick Solis
(74) Attorney, Agent, or Firm—Daly, Crowley & Mofford, L.L.P.; Julia Voutyras

(57) ABSTRACT

A method for controlling partial air pressure in an intake manifold of an engine. The engine has an intake throttle device for controlling a flow of air to the intake manifold. An EGR valve is provided for controlling a flow of exhaust gas from the engine to the intake manifold downstream of the intake throttle. The engine has at least one cylinder fed a flow comprising air passing through the throttle to the intake manifold and exhaust products passing through the EGR valve to the intake manifold. Both the air through the throttle and the exhaust gas products in the intake manifold are passed as a combined flow to the intake manifold and then to the at least one cylinder. The method includes: specifying a dynamic reference model for the desired partial pressure of the air as a function of time; and controlling the flow through the intake throttle device in accordance with an estimated EGR flow obtained by a dynamic observer and an estimate of partial air fraction in the exhaust gas products. In one embodiment, the partial air fraction is estimated in accordance with intake to exhaust delay and fuel injection to exhaust delay. In one embodiment the dynamic observer does not require information of engine exhaust temperature, engine exhaust pressure, or EGR valve position.

7 Claims, 1 Drawing Sheet

METHOD AND SYSTEM FOR CONTROLLING PARTIAL PRESSURE OF AIR IN AN INTAKE MANIFOLD OF AN ENGINE

TECHNICAL FIELD

This invention relates generally to methods and systems for controlling the partial pressure of air in an intake manifold of an engine.

BACKGROUND AND SUMMARY OF THE INVENTION

As is known in the art, the mass of air, or cylinder air charge, inducted into each cylinder of an internal combustion engine must be known as precisely as possible in order to match the air mass with an appropriate mass of metered fuel. Placing sensors at the intake port of each cylinder is technically very difficult and expensive. Instead, a sensor is typically located either inside the intake manifold or at the throttle opening into the intake manifold. A physics model is then used to estimate the air mass propagation through the intake manifold into each cylinder.

Two types of the above-described sensors are typically employed in internal combustion engines. One type is a manifold absolute pressure (MAP) sensor. An estimation algorithm treats the manifold pressure as an input to the system and uses mapped engine data and engine speed to estimate air flow into the engine cylinders. The other type of sensor is a relatively expensive mass air flow (MAF) sensor used to directly measure mass air flow at the throttle body. For the MAF based system, fresh air from the throttle is directly measured. EGR gas content is left out of the cylinder port air charge estimation. Other air flows not from the throttle (via vacuum lines from the brakes, canister purge system, etc.) are not accounted for by the MAF measurement and must be accounted for by other means.

The MAP sensor measures the absolute pressure in the intake manifold and thus incorporates the air flow from all sources. Difficulties arise, however, when gases other than air are introduced into the intake manifold. For the MAP based system (often referred to as a speed density system), gases other than air, such as the deliberately introduced exhaust gas (referred to as EGR or exhaust gas recirculation), increase the manifold pressure. These gases should not be matched by fuel. However, the MAP sensor cannot distinguish between fresh air and EGR. Thus, EGR mass in the intake manifold must be measured or estimated.

More particularly, control of the partial pressure of air has to be achieved under uncertainties in the EGR flow. These uncertainties are due to the soot deposits in the EGR valve conduit and the fact that the exhaust pressure and temperature are not measured. Additionally, air is present in the EGR flow during lean operation and this air needs to be accounted for in the partial pressure of air estimate.

In accordance with the present invention, a method is provided for controlling partial pressure of air in an intake manifold of an engine. The engine has an intake throttle device for controlling a flow of air to the intake manifold. An EGR valve is provided for controlling a flow of exhaust gas from the engine to the intake manifold downstream of the intake throttle. The engine has at least one cylinder fed a flow comprising air passing through the throttle to the intake manifold and exhaust products passing through the EGR valve to the intake manifold. Both the air through the throttle and the exhaust gas products in the intake manifold are passed as a combined flow to the intake manifold and then to the at least one cylinder. The method includes: specifying a dynamic reference model for the desired partial pressure of the air as a function of time; and controlling the flow through the intake throttle device in accordance with an estimated EGR flow obtained by a dynamic observer and an estimate of partial air fraction in the exhaust gas products.

In one embodiment, the partial air fraction is estimated in accordance with intake to exhaust delay and fuel injection to exhaust delay.

In one embodiment the dynamic observer does not require information of engine exhaust temperature, engine exhaust pressure, or EGR valve position.

According to the present invention, there is provided a method controlling partial air pressure in an intake manifold of an engine. The engine has an intake throttle device for controlling a flow of air to the intake manifold. An EGR valve is provided for controlling a flow of exhaust gas from the engine to the intake manifold downstream of the intake throttle. The engine has at least one cylinder fed a flow comprising air passing through the throttle to the intake manifold and exhaust products passing through the EGR valve to the intake manifold. Both the air through the throttle and the exhaust gas products in the intake manifold are passed as a combined flow to the intake manifold and then to the at least one cylinder. The method includes: calculating the desired partial pressure of air dynamically, as a function of time in accordance with a reference model, estimating the flow of exhaust gas products passing through the EGR valve to the intake manifold from engine operating parameters; estimating the air fraction in the estimated flow of exhaust gas products passing through the EGR valve to the intake manifold; determining the partial pressure of air in the intake manifold from such estimate of the flow of exhaust gas products and such estimate of the air fraction; and, adjusting the intake throttle device in accordance with a difference between a desired partial pressure of the air in the intake manifold and the determined partial pressure of air in the intake manifold.

In a preferred embodiment of the invention, the estimate of the flow of gas products passing through the EGR valve comprises providing such estimate in accordance with an open loop estimator.

In accordance with the present invention, a method is provided for controlling partial air pressure in an intake manifold of an engine. The method includes estimating partial air pressure in intake manifold based on open loop observer and estimated partial air fraction in the flow of exhaust to the intake manifold.

The details of one or more embodiments of the invention are set forth in the accompanying drawings and the description below. Other features, objects, and advantages of the invention will be apparent from the description and drawings, and from the claims.

DESCRIPTION OF DRAWINGS

The single FIGURE is a schematic diagram of an engine system having control of partial air pressure at an intake manifold thereof.

DETAILED DESCRIPTION

Figure 1:
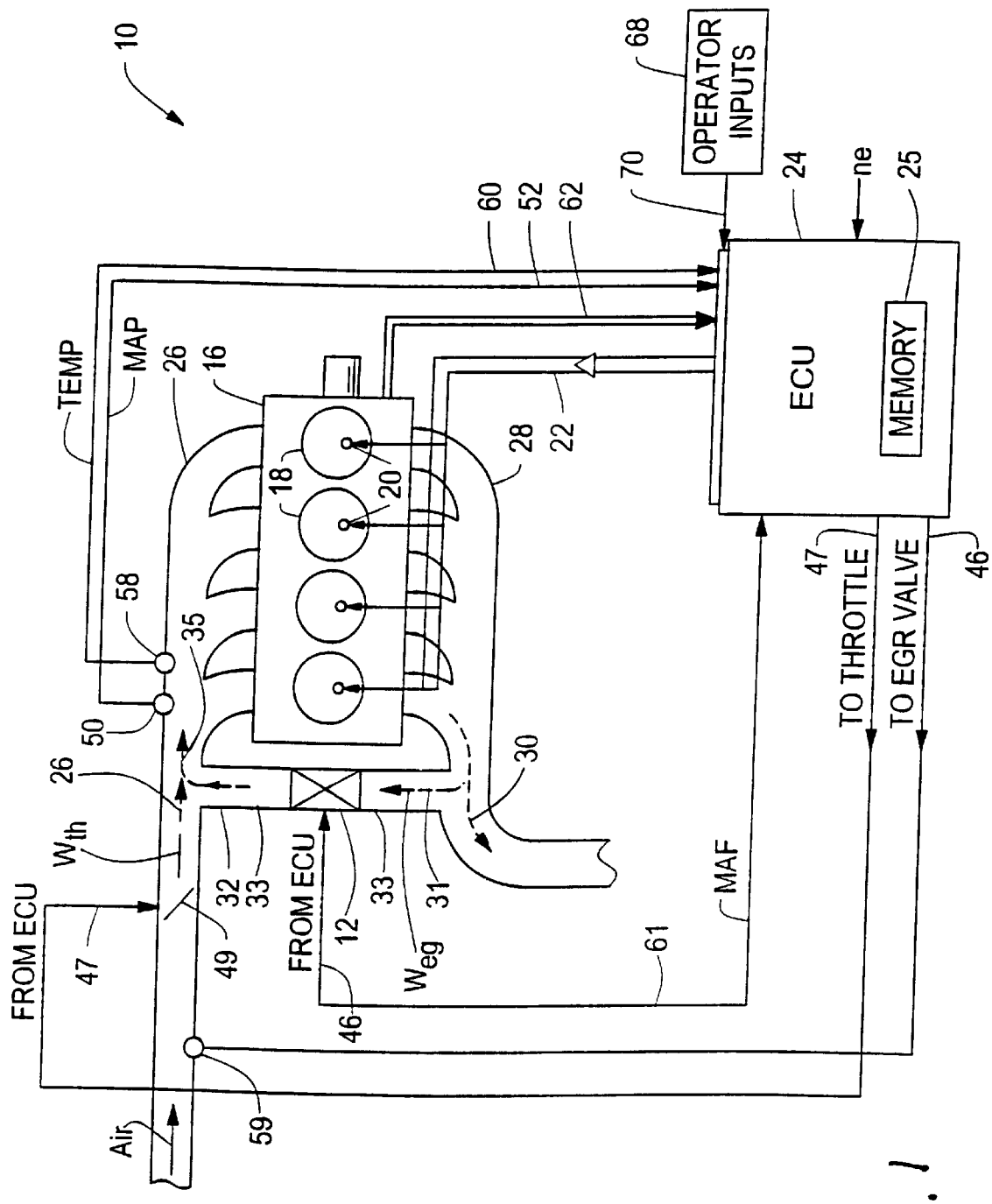

Referring now to FIG. 1, a gasoline engine system 10 is shown to include an engine block 16 is shown having for example, four cylinders 18. Each of the combustion chambers 18 includes here for example direct-injection fuel injectors 20. The duty cycle of the fuel injectors 20 is determined by the engine control unit (ECU) 24 and transmitted along signal line 22.

The engine system 10 has an intake throttle device 49 for controlling a flow of air to an intake manifold 26. An EGR valve 12 is provided for controlling a flow of a portion of exhaust gas (shown by arrow 31) passing from the engine to the intake manifold 26 downstream of the intake throttle 49. The portion of the exhaust gas passing through the EGR valve 12 is indicated by arrow 32. The cylinders 18 are thus fed a flow comprising air passing through the intake throttle device 49 to the intake manifold 26 and the portion of the exhaust gas products passing through the EGR valve 12 to the intake manifold 26. Both the air through the throttle 49 and the exhaust gas products in the intake manifold are passed as a combined flow to the cylinders 18, such combined flow being indicated by the arrow 35.

The EGR system is provided to reduce the level of NOx emissions. The EGR system comprises the EGR valve 12 disposed in a conduit 33 connecting the exhaust manifold 28 to the intake manifold 26. This allows a portion of the exhaust gases to be circulated from the exhaust manifold 28 to the intake manifold 26 as described above. It is noted that the flow of exhaust gas though the EGR valve 12 is a function of the pressure across such valve 12 in addition to the electrical signal provided to the valve on line 46 from the ECU 24. Here, there is no pressure sensor at the input to the EGR valve 34 (i.e., in the exhaust manifold 28). The electrical signal on line 46 is produced by the ECU 24 from relationships stored a priori in the ECU 24 in accordance with a computer program stored in a memory 25 in the ECU 24.

All of the engine systems, including the EGR valve 12, fuel injectors 20, intake throttle device 49 are controlled by the ECU 24. For example, signal 46 from the ECU 24 regulates the EGR valve 12 position and a signal on line 47 controls the position of the intake throttle device 49.

In the ECU 24, the command signal 47 to the intake throttle device 49 will be described in detail below. Suffice it to say here, however, that the signal on line 47 for the intake throttle device 49 is produced by the ECU 24 to provide a desired partial air pressure in the intake manifold 26. Additional sensory inputs are also received by the ECU 24 via lines 62 along with: engine intake manifold temperature, TEMP, as measured by temperature sensor 50 which produces a signal on line 52; mass air flow, MAF, to the intake throttle device 49 as measured by flow sensor 59 which produces a signal on line 61; mass air pressure (MAP) as measured by intake manifold pressure sensor 58 which produces a signal on line 52; and engine speed which is fed to the ECU 24 as the signal, $n_e$, etc. Additional operator inputs 68 are received along signal 70 such as the accelerator pedal position.

As will be described in more detail below, a set of control instructions or code are stored in a memory 25 in the ECU 24. Execution of the stored code by the ECU 24 results in a method being performed which estimates the flow of exhaust gas products passing through the EGR valve 12 to the intake manifold 26 from engine operating parameters; estimates the air fraction in the estimated flow of exhaust gas products passing through the EGR valve 12 to the intake manifold; determines the partial pressure of air in the intake manifold 26 from such estimate of the flow of exhaust gas products and such estimate of the air fraction; and, adjusts the intake throttle device 49 position in accordance with a difference between a desired partial pressure of the air in the intake manifold and the determined partial pressure of air in the intake manifold. The estimate of the flow of gas products passing through the EGR valve 12 provides such estimate in accordance with an open loop estimator to be described.

It should first be noted that the following notation is used herein, reference being made to FIG. 1:

^ denotes an estimated value of an engine operating parameter;

$t_k$ is the time of a sample of the parameter;

dT is the period between samples of the parameter;

T, is the temperature measured in the engine intake manifold (i.e., the signal TEMP on line 60);

$W_{th}$ is the mass air flow measured through the engine intake throttle (i.e., the signal MAF on line 61);

$W_{cyl}$ is the total flow into a cylinder of the engine;

$W_{cyl,air}$ is the partial flow of air into a cylinder of the engine (estimated in a manner to be described below);

$W_{egr}$ is the exhaust gas recirculation (EGR) flow (estimated in a manner to be described below);

$\chi$ is the air fraction in the exhaust gas of the engine (estimated in a manner to be described below);

$V_{IM}$ is a priori measured intake manifold volume;

$V_d$ is a priori measured cylinder displacement;

$P_{air}$ is the partial pressure of air measured in the intake manifold (i.e., the MAP signal on line 52);

$P_{air,d}$ is the desired partial pressure in the intake manifold 26;

$p=p_{air}+p_{bg}$ (where $P_{air}$ is the total pressure in the intake manifold and $p_{bg}$ is the partial pressure of burnt gas in the intake manifold);

$n_e$ is measured engine speed in revolutions per second;

$\eta_v$ is engine volumetric efficiency;

$\Delta_{fi}$ is fuel injection to exhaust delay $\Delta_{io}$ is intake to exhaust delay R is the gas constant To maintain good engine performance it is desirable to have a well-controlled partial pressure of air response in the intake manifold 26. The desired response for the partial pressure of air is here defined by a reference model, here a first order system:

$$p_{air}(t_{k+1})=p_{air}(t_k)+dT(-\lambda \cdot (p_{air}(t_k)-p_{air,d})) \quad (1)$$

where;

$p_{air}$ is the actual partial pressure in the intake manifold 26; and $p_{air,d}$ is the desired behavior of partial pressure of air in the reference model, as presented above in equation (1).

In order to achieve this desired partial pressure, $P_{air,d}$, the intake throttle 49 is adjusted to provide the following air flow through such throttle 49:

$$W_{th,d}(t_k) = -\frac{\lambda(\hat{p}_{air}(t_k) - p_{air,d})V_{IM}}{R\hat{T}(t_k)} + \hat{W}_{cyl,air}(t_k) - \hat{\chi}(t_k) \cdot \hat{W}_{egr}(t_k) \quad (2)$$

In order to determine $W_{th,d}(t_k)$ from equation (2), while the following parameters are known: $V_{IM}$, R, T and, as will be described, $\lambda$, an estimate of $W_{cyl,air}$, $\chi$, $W_{egr}$, and $p_{air}$ are determined as described below.

Given this desired flow rate of air through the throttle, $W_{th,d}$ we backtrack the desired throttle device 49 position to provide this flow and set the throttle device 49 to that position via the signal on line 47.

The parameter λ is adjusted to ensure the desired shape of the engine torque response. A larger λ provides faster torque response; however, very large λ s should not be used since fast torque response may cause driveline oscillations and other driveability problems and also may cause the estimators employed throughout perform poorly (i.e., not be able to track or catch up with a fast engine behavior).

The estimates of $W_{cyl,air}$, $\chi$, $W_{egr}$, and $p_{air}$ are determined as follows:

(1) Determine throttle flow, $W_{th}$, by estimates thereof or by measuring the mass air flow (MAF) with MAF sensor 59, as indicated in FIG. 1

(2) Estimate or measure the intake manifold pressure $p(t)$ with a MAP sensor 50 as indicated in FIG. 1;

(3) Estimate cylinder flow $W_{cyl}(t_k)$ at the present sampling time instant, $t_k$, in accordance with:

$$\hat{W}_{cyl}(t_k) = \eta_v(t_k) \frac{n_e(t_k)}{2} V_d \frac{p(t_k)}{\hat{T}(t_k)}$$

where:

$\eta_v(t_k) = \eta_v(n_e(t_k), p(t_k))$ is volumetric efficiency obtained from a look-up table or a regression equation (4) Determine the estimate of the EGR flow in accordance with the following:

It is first noted from FIG. 1 that the amount of air flow in the exhaust gas returned to the intake manifold through the EGR valve is $\chi * W_{egr}$, where, as noted above, $W_{egr}$ is the total exhaust gas recirculation flow and $\chi$ is air fraction in the exhaust gas. Here, estimates are made of the air fraction in the exhaust gases by making estimates of $\chi$ and $W_{egr}$ in accordance with:

$$\hat{\chi}(t_k) = \frac{\max\left\{\hat{W}_{cyl,air}(t_k - \Delta_{io}) - \frac{W_f(t_k - \Delta_{fi})}{(A/F)_s}, 0\right\}}{\hat{W}_{cyl}(t_k - \Delta_{io}) + W_f(t_k - \Delta_{fi})}$$

where:

(A/F)s is the stoichiometric air-to-fuel ratio (approx. 14.64), and $$\hat{W}_{egr}(t_k) = \frac{V_{IM}}{R\hat{T}(t_k)}(\varepsilon(t_k) - \gamma \cdot p(t_k)),$$

respectively, where $\varepsilon$ is an open loop estimator state which is updated in accordance with:

$$\varepsilon(t_{k+1}) = \varepsilon(t_k) + dT\left(-\gamma\varepsilon(t_k) - \gamma\frac{R\hat{T}(t_k)}{V_{IM}}(W_{th}(t_k) - \hat{W}_{cyl}(t_k)) + \gamma^2 p(t_k)\right)$$

The estimate of the partial pressure of air in the intake manifold is given by:

$$\hat{p}_{air}(t_{k+1}) = \hat{p}_{air}(t_k) + dT\left(\frac{R\hat{T}(t_k)}{V_{IM}}(W_{th}(t_k) + \hat{W}_{egr}(t_k)\hat{\chi}(t_k) - \hat{W}_{cyl,air}(t_k))\right)$$

Having determined the desired throttle flow, $W_{th,d}$ as function of $P_{air,d}$ in accordance with equation (2), the intake throttle device 49 position signal on line 47 is set as a function of $p(t_k)/p_{amb}$ and $W_{th,d}$ to match $W_{th,d}$ $$\alpha_{th} = A^{-1}\left(W_{th,d} / f_{th}\left(\frac{p(t_k)}{p_{amb}}\right) / \frac{p_{amb}}{\sqrt{T_{amb}}}\right),$$

where A is the throttle position to throttle effective flow area (geometric flow area times the discharge coefficient) map, $A^{-1}$ is its inverse, $\alpha_{th}$ is the throttle position, $T_{amb}$ is the ambient temperature, $p_{amb}$ is ambient pressure and $$f_{th}(x) = \begin{cases} \gamma^{0.5}\left(\frac{2}{\gamma+1}\right)^{\frac{\gamma+1}{2(\gamma-1)}}, & x \leq 0.5, \\ x^{\frac{1}{\gamma}}\left\{\frac{2\gamma}{\gamma-1}\left[1 - x^{\frac{\gamma-1}{\gamma}}\right]\right\}^{\frac{1}{2}}, & x \geq 0.5 \end{cases}$$

where $\gamma = 1.4$

The EGR flow is controlled with EGR valve 12 via the signal on line 46 while the fuel and spark are adjusted as desired with the remainder of the control system.

In summary, the method described above combines an estimator for the EGR flow that uses intake manifold pressure and throttle flow measurements, with an open-loop estimator for the air fraction in the exhaust gas. This EGR flow estimator provides a robust way of estimating the EGR flow in presence of significant uncertainties in the EGR valve conduit. The controller for the electronic intake throttle device is then developed to enforce the desired response of the partial pressure of air estimate.

A number of embodiments of the invention have been described. Nevertheless, it will be understood that various modifications may be made without departing from the spirit and scope of the invention. Accordingly, other embodiments are within the scope of the following claims.

What is claimed is:

1. A method for determining partial air pressure in an intake manifold of an engine, such engine having an intake throttle device for controlling a flow of air to the intake manifold, an EGR valve for controlling a flow of exhaust gas from the engine to the intake manifold downstream of the intake throttle, at least one cylinder fed a flow comprising air passing through the throttle to the intake manifold and exhaust products passing through the EGR valve to the intake manifold, both the air through the throttle and the exhaust gas products in the intake manifold passing as a combined flow to the intake manifold and then to the at least one cylinder, such method comprising:

estimating the flow of exhaust gas products passing through the EGR valve to the intake manifold;

determining intake manifold pressure;

determining air flow through the throttle device to the intake manifold;

estimating the air fraction in the portion of the exhaust gas products passing to the intake manifold;

combining the estimated flow of gas products, the determined intake manifold pressure, with the estimated air fraction to determine the partial air pressure in the intake manifold.

2. The method recited in claim 1 wherein the estimate of the air fraction comprises using an open loop estimator.

3. The method recited in claim 1 wherein the estimate of the flow of gas products passing through the EGR valve comprises providing such estimate in accordance with an open loop estimator.

4. The method recited in claim 3 wherein a dynamic observer is void of information of engine exhaust temperature.

5. The method recited in claim 3 wherein a dynamic observer is void of information of engine exhaust pressure.

6. A method for controlling partial air pressure in an intake manifold of an engine, such engine having an intake throttle device for controlling a flow of air to the intake manifold, an EGR valve for controlling a flow of exhaust gas from the engine to the intake manifold downstream of the intake throttle, and, at least one cylinder fed a flow comprising air passing through the throttle to the intake manifold and exhaust gas in the intake manifold passing through the EGR valve to the at least one cylinder, such method comprising:

estimating partial air pressure in intake manifold based on open loop observer and estimated partial air fraction in the flow of exhaust to the intake manifold.

7. An engine control unit programmed to execute the following:

estimate partial air pressure in an intake manifold based on open loop observer and estimated partial air fraction in a flow of exhaust to the intake manifold.

* * * * *